June 9, 1942.  L. A. AMTSBERG  2,285,638
IMPACT CLUTCH
Filed Nov. 22, 1939  3 Sheets-Sheet 1
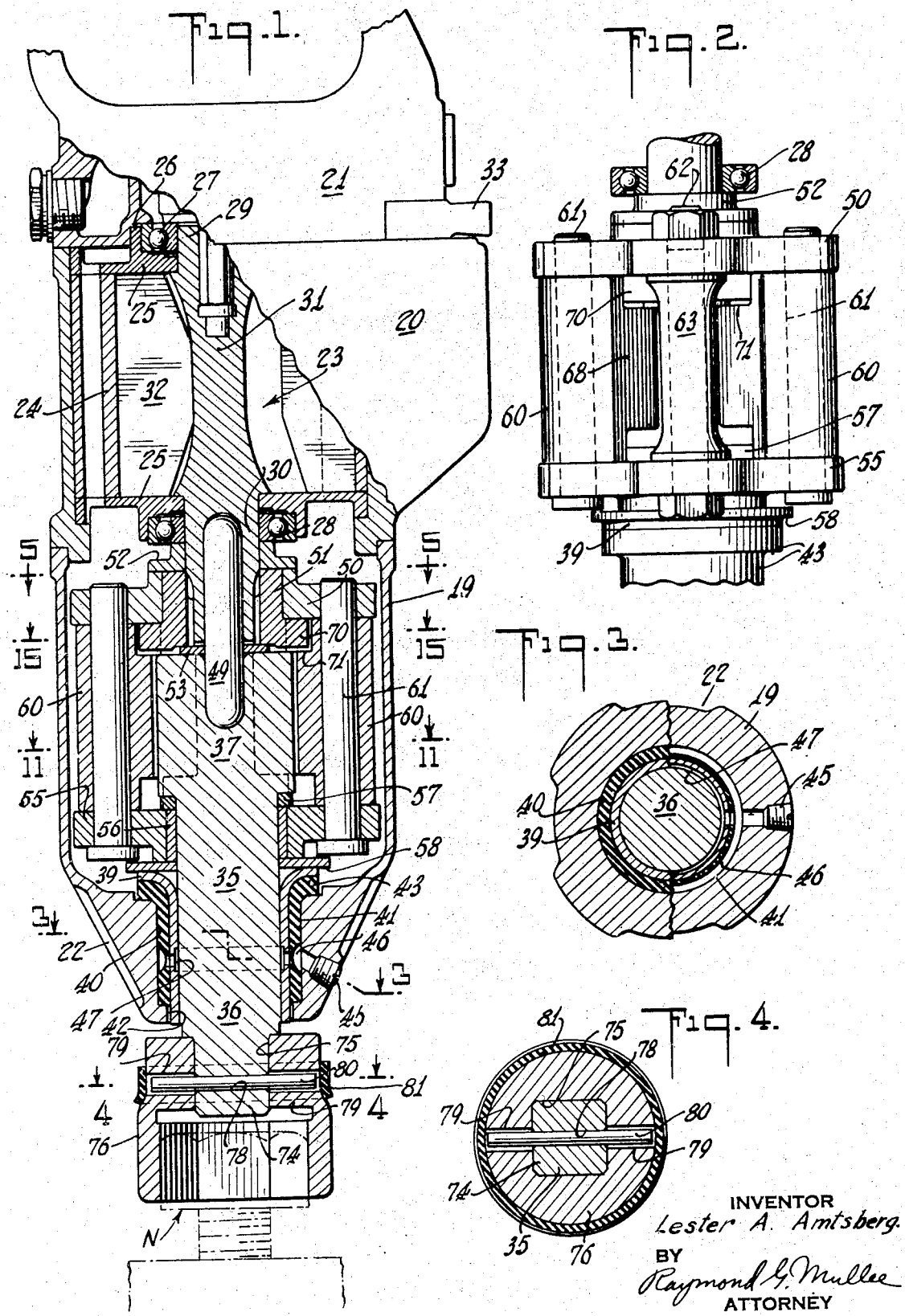
INVENTOR
Lester A. Amtsberg.
BY
Raymond G. Mullee
ATTORNEY

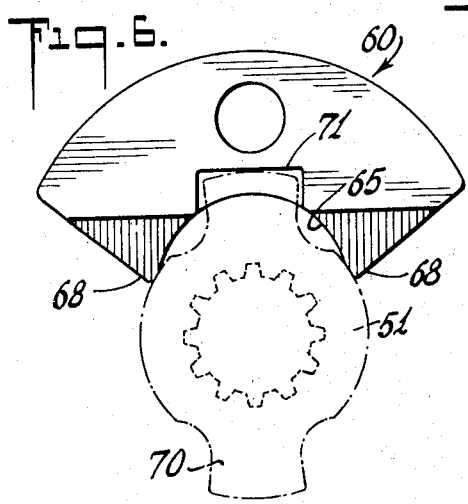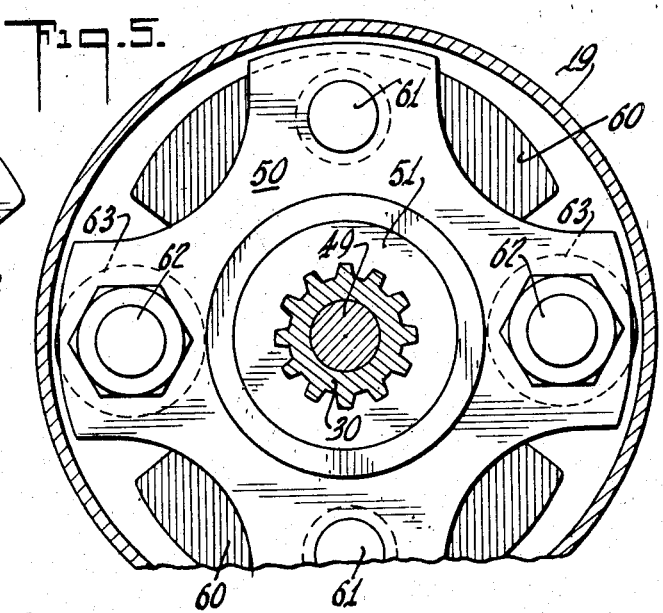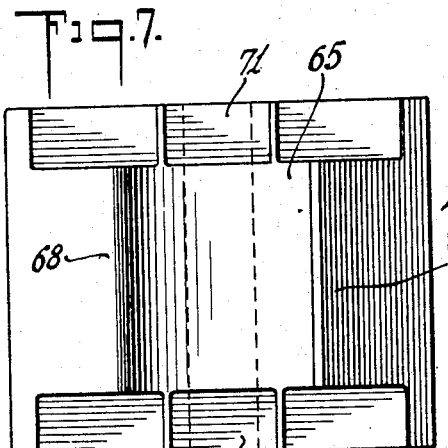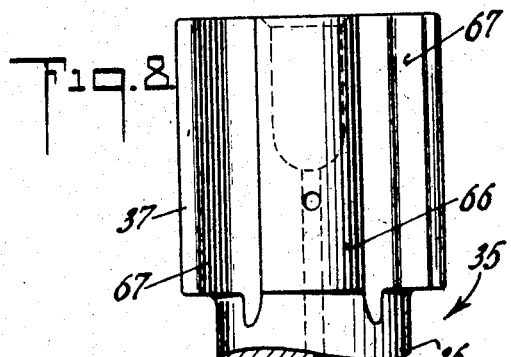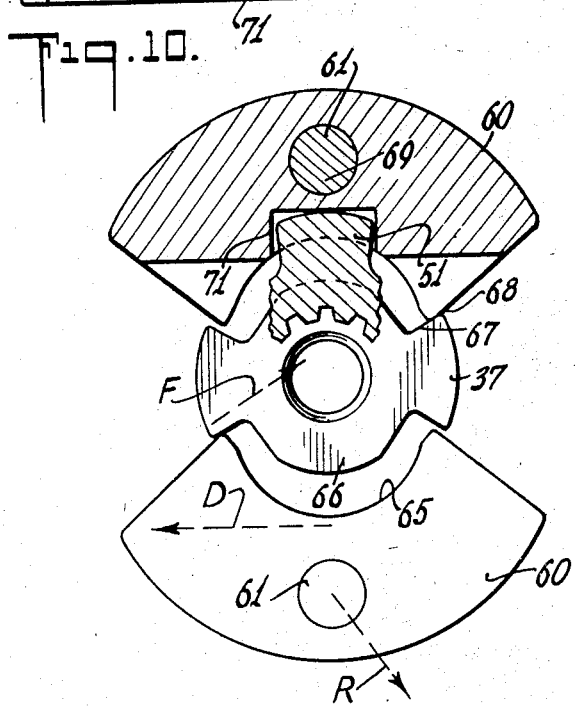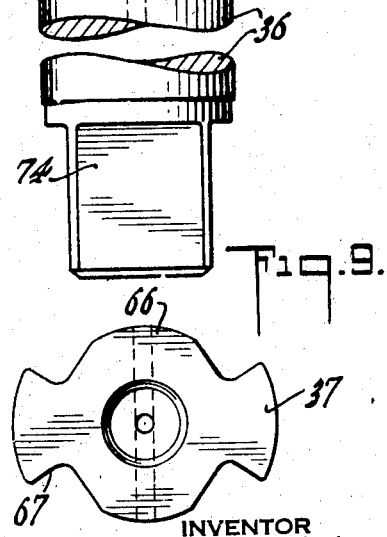

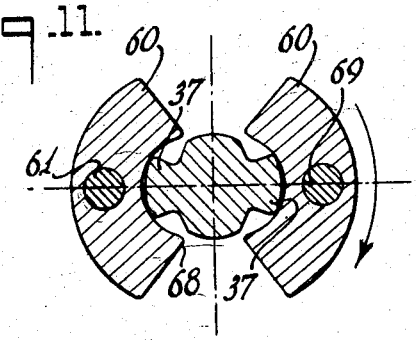
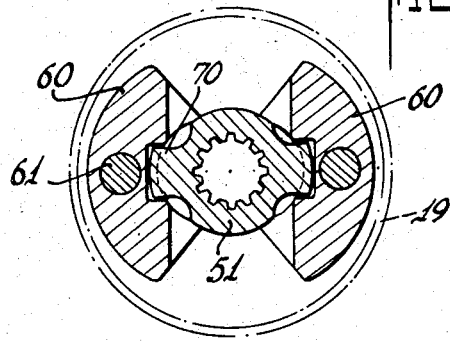
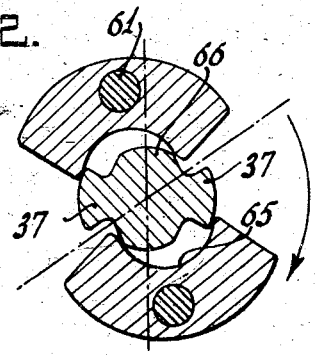
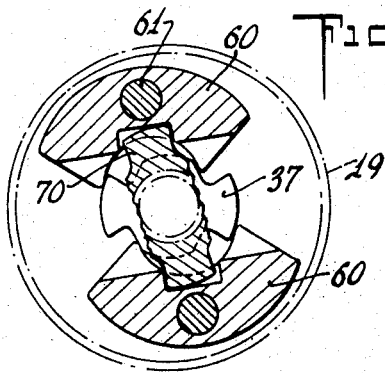
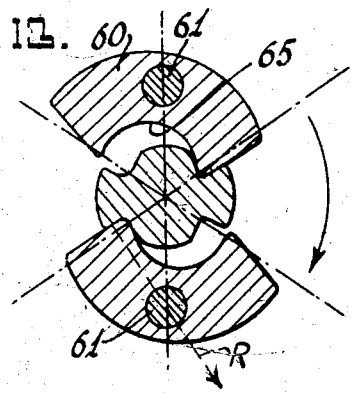
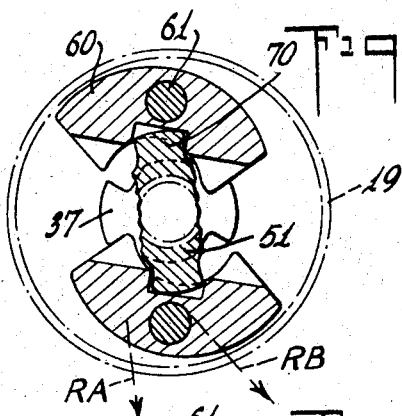
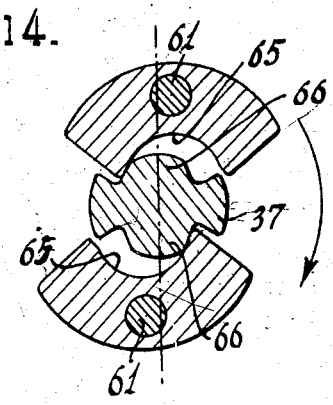
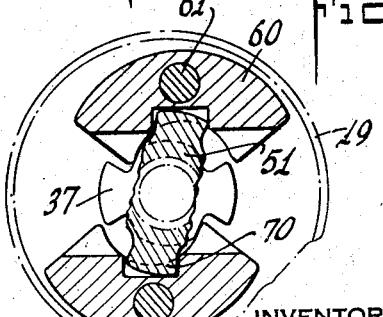

Patented June 9, 1942

2,285,638

UNITED STATES PATENT OFFICE 2,285,638

IMPACT CLUTCH

Lester A. Amtsberg, Cleveland, Ohio, assignor to Chicago Pneumatic Tool Company, New York, N. Y., a corporation of New Jersey Application November 22, 1939, Serial No. 305,708

22 Claims. (Cl. 192—30.5)

This invention relates to clutches, especially of the class which automatically disengages and re-engages to deliver to a driven spindle a succession of rotational impulses having an instantaneous torque far exceeding the normal torque of the driving shaft.

There are in general two types of rotary motor operated impact wrenches in common use. One is the torque responsive, resilient accumulator, type which stores potential energy in a device such as a spring while the driving shaft rotates ahead of the hammer, releases on overload, and uses the stored energy to accelerate the hammer as it moves into re-engagement with the anvil or driven spindle, the driving shaft being rotated more or less continuously by a motor operating through reduction gearing. The other is the speed repsonsive or centrifugal type which disengages when the driving shaft slows down, and relies solely upon the motor to accelerate the hammer during the lost motion period, the hammer being directly connected to the motor thereby causing the latter to start and stop during each impacting cycle. Both types contain certain parts subjected to repeated shocks of exceedingly great magnitude and therefore are the subject of persistent research to minimize the frequency of breakage and service difficulties.

The present invention, while including certain features susceptible of embodiment in impact wrenches of conventional types, does not depend for its operation upon either spring accumulator or speed responsive mechanism and overcomes many of the objections and limitations incident to their use.

Among the objects of the invention are:
1. To relieve the impact surfaces of forces causing rapid wear;
2. To make possible satisfactory operation at either low or high speed;
3. To insure proper alignment of the impact surfaces or shoulders, irrespective of the mean speed of the motor;
4. To delay starting of the declutching movement of the hammer relative to the anvil until delivery of the torsional impact has been completed;
5. To avoid the possibility of the clutch sticking or refusing to separate when the motor is stalled;
6. To obviate the use of springs;
7. To minimize servicing troubles, such as breakage, and to prolong the useful life of the parts of the wrench;
8. To simplify the construction and reduce the manufacturing cost; and
9. To increase the power, or maximum torque output, of an impact wrench of a given size and weight.

In accordance with the invention, the driven spindle or anvil is surrounded by a hammer assembly consisting of hammer dogs adapted to rock, for declutching and reclutching, about pivot pins parallel to the axis of the anvil. The delivery of torque to the hammer assembly is effected by cams acting direct on the hammer dogs at a point offset from the pivot and the pressure of the cam is resolved into a rotational driving component and a rocking or declutching component. According to an important feature of the invention, the declutching component is arranged to be ineffective to initiate declutching movement of the hammer until the anvil has absorbed the momentum thereof and the pressure on the impact shoulders has been relieved. By this arrangement, the invention obviates excess wear on the impact surfaces which was occasioned in some prior wrenches by the rubbing of the surfaces together under tremendous pressure as the impacting and declutching actions occurred simultaneously. According to another feature of the invention, reclutching with the impact shoulders always in complete alignment is assured by a set of cams between the hammer dog and anvil.

In the design of an impact wrench according to this invention, advantage may be taken of centrifugal force, but the use of such force is not indispensable to the attainment of the primary objects of the invention, since the declutching and reclutching movements are obtained by the use of cam mechanism.

Other objects and features of the invention will appear more clearly from the following description taken in connection with the accompanying drawings and appended claims.

In the accompanying drawings which illustrate one embodiment of the invention:

Fig. 1 is a longitudinal section of an impact wrench, the grip handle and motor housing being shown partly in elevation and the upper end of the handle being broken away;

Fig. 2 is a side elevation of a part of the wrench shown in Fig. 1, looking in the same direction, illustrating particularly the clutch hammer assembly, the clutch housing being omitted;

Fig. 3 is a cross section as indicated by the broken line 3—3 in Fig. 1, illustrating the shock absorbing bushing for the front head;

Fig. 4 is a cross section as indicated by the arrows 4 in Fig. 1, illustrating the socket securing pin and the retainer for the pin;

Fig. 5 is a cross section as indicated by the arrows 5 in Fig. 1, showing particularly the clutch hammer dogs and the means for pivotally carrying them, a part of clutch mechanism being broken away;

Fig. 6 is a plan view of one of the clutch dogs, and also illustrates in dotted lines the driving cam in one of its operative positions relative to the dog;

Fig. 7 is a side elevation of the clutch hammer dog shown in Fig. 6, looking away from the axis of revolution of the clutch;

Fig. 8 is a side elevation of the anvil member or tool head, partly broken away;

Fig. 9 is a plan view of the tool head shown in Fig. 8;

Fig. 10 is a diagrammatic view illustrating the relative positions of the hammer dogs, driving cam and anvil at the instant immediately following the delivery of a hammer blow and with the dogs being released from the anvil in response to forces set up by the driving cam;

Fig. 11 is a cross section through the hammer dogs and anvil as indicated by the arrows 11 in Fig. 1, the clutch housing being omitted, the relative positions of the clutch elements being such that the impact shoulders are out of engagement and the dog is being rocked about its own axis by the camming action of the anvil;

Fig. 12 is a view similar to Fig. 11 but showing the hammer dogs in a more advanced position and approaching the impact shoulders on the anvil;

Fig. 13 is a view similar to Fig. 11 but showing the position of the hammer dogs at the instant that the blow is delivered and while the momentum of the hammer dogs is being absorbed by the anvil;

Fig. 14 is a view similar to Fig. 11 but showing the hammer dogs as they are positioned immediately following their release from the impact shoulders on the anvil;

Fig. 15 is a cross section through the hammer dogs and driving cam, as indicated by the arrows 15 in Fig. 1, the clutch housing being outlined, the relative position of the hammer dogs corresponding to Fig. 11; and Figs. 16, 17 and 18 are cross sections similar to Fig. 15 but with the relative positions corresponding to Figs. 12, 13 and 14 respectively, portions of the driving cam being omitted in order to show the anvil more clearly.

Figs. 1 to 4 are on a smaller scale than Figs. 5 to 10, both inclusive, while the remaining figures are drawn to a still smaller scale.

The principal parts of the illustrative clutch are enclosed within a clutch housing 19, shown in Fig. 1. This housing is detachably secured in fixed relation to a motor housing 20 and a pistol grip handle 21 by any suitable means such as the usual arrangement of bolts and flanges (not shown). The front end of the clutch housing is tapered and fluted at 22 to provide another grip portion.

A reversible air motor 23 within the motor housing includes a cylinder or cylinder liner 24 the ends of which abut against end plates 25. The rear end plate has a flange 26 fitting a recess in the handle member 21 and a peripheral portion fitting the motor housing 20. Flange 26 surrounds and supports a ball bearing 27 held between end plate 25 and grip handle 21. A similar ball bearing 28 is mounted in a flange, projecting forwardly from the front end plate 25. Ball bearings 27 and 28 respectively support rear and front shafts 29 and 30 integral with and projecting from a rotor 31. The rotor is of cylindrical shape and is arranged coaxially with its shaft and with the clutch housing 19 but eccentric with the cylinder 24 to provide a crescent shaped chamber between the rotor and cylinder. The rotor is provided with a plurality of radial slots in which blades 32 are mounted for movement with their outer edges in scraping contact with the cylinder to divide the crescent shaped chamber into a series of pockets between the inlet and exhaust ends. A reverse lever 33 controls the direction of flow of compressed air and hence the direction of rotation of motor 23. For a further description of one form of motor which may be employed to drive the clutch of the present invention, reference is made to Amtsberg, U. S. Patent 2,077,733, April 20, 1937.

Positioned centrally of the clutch housing is a rotatable tool head or driven spindle 35 having an elongated shank 36 and having an anvil portion comprising jaws 37 adapted to receive rotational impacts as hereinafter described. Under the usual operating conditions these impacts tend to misalign the tool head axis, as it is practically impossible to manufacture an impact clutch in which both anvil jaws are always struck with the same force at exactly the same instant. In prior devices the continual radial vibration of the tool head due to imperfectly balanced impacts gradually enlarged the bore on the front end of the clutch housing and in time caused the housing to crack. This defect has been overcome by the use of a novel means for supporting the tool head.

Shank 36 of the tool head is supported with a rotating fit in a steel bushing 39. A resilient sleeve 40 made of oil resisting rubber surrounds the bushing and is vulcanized to the outer surface thereof. A synthetic rubber-like material known to the trade as "Neoprene" is suitable for this purpose. The synthetic rubber sleeve 40 has a press fit with a counter bore 41 near the front end of clutch housing 19 and the lower end of the sleeve rests on a shoulder extending between the counter bore and a bore 42. The bore last mentioned is slightly larger in diameter than the steel bushing 39 and in operation metal-to-metal contact between the bushing and housing is avoided. The upper end of the resilient sleeve terminates at an annular flange 43 supporting a similar flange on the steel bushing and seated on a shoulder of the clutch housing.

Lubrication of the interior of the steel bushing 39 may be effected by removing a grease plug 45 from a threaded opening in the clutch housing which provides access to an annular groove 46 formed around the synthetic rubber sleeve 40. Complementary, registering ports in the sleeve and bushing admit lubricant to an annular groove 47 formed on the inner surface of the steel bushing.

The rear end of the tool head 35 is supported in axial alignment with the steel bushing 39 and with rotor shaft 30 by means which include a pilot shaft 49 seated in complementary recesses in the rotor shaft 30 and tool head.

According to a novel feature of this invention, the hammer assembly surrounds the anvil and is supported at the front and rear ends of the anvil for revolution about the axis of the latter, the arrangement resembling a squirrel cage. This arrangement as compared with prior impact wrench constructions makes it possible to increase the moment of inertia of the hammer and hence the force of the blow without correspondingly increasing the length, diameter or weight of the wrench. The anvil jaws 37 may be designed at any desired length in an axial direction without increasing the liability of breakage of the anvil. The hammer assembly extends between two similarly constructed end plates which constitute carriers by which the assembly is revolubly supported. Rear carrier 59 is mounted for oscillatory movement about a bearing surface provided on the rear end of a driving cam 51 splined to the rotor driving shaft 30. A bearing spacer 52 abuts against the rotor bearing 28 at is rear end and the driving cam 51 and hammer carrier 50 at its front end to secure the cam and carrier against rearward axial movement. A thrust plate 53 surrounding the pilot shaft 49 engages the front end of the driving cam and the rear face of the tool head 35 permitting relative rotation therebetween. Forward movement of the carrier 50 is prevented by engagement by cam projections radiating from the front end of the cam 51 and to be described hereinafter. The front end plate or front carrier 55 for the hammer assembly is mounted for rotary movement relative to the shank 36 of the tool head 35, a bushing 56 being interposed between the carrier and the tool head. The rear and front ends of the bushing 56 and front carrier 55 abut against a shank spacer 57 and a thrust washer 58 respectively. The shank spacer engages the front of the anvil jaws 37 while the thrust washer seats on the steel bushing 39 whereby the tool head 35 and carriers 50 and 55 are supported against axial thrusts.

A pair of heavy hammer dogs 60, similarly constructed and arranged, are supported for oscillatory movement about pivot pins 61 which extend through openings in the dogs and carriers, the heads of the pivot pins being retained by the thrust washer 58. A pair of bolts 62 are arranged to pass through openings in the carrier plates and each bolt is surrounded by a spacer sleeve 63 whose ends abut against the carrier plates. The bolts and pivot pins are evenly spaced about the axis of revolution, as illustrated in Fig. 5 and extend parallel to the axis of revolution and cooperate with each other to hold the carriers rigidly in fixed relation to each other and to the pivot pins.

The hammer dogs 60 are capable of delivering torsional impulses to the tool head far in excess of the maximum torque of the motor 23 without resorting to reduction gearing, resilient power accumulators or spring operated clutching mechanism which have limited the extent of use of prior impact wrenches while creating maintenance and servicing difficulties. Here, the hammer dogs are positively guided, after their release from driving relation with the anvil, by complementary surfaces on the dogs and anvil until the striking surface on the hammer dog is properly oriented into the annular path of the stricken surface on the anvil. The invention causes the impact surfaces to be held in engagement until revolution of the hammer assembly has been arrested (relative to the anvil) and the full momentum of the hammer transformed to the anvil as a rotational hammer blow. Upon termination of the blow the hammer dogs are automatically declutched by a novel mechanism which includes a set of cams between the rotor shaft and the hammer dogs. The declutching mechanism is designed with a view toward delaying its effectiveness until the contact pressure between the hammer and anvil has been reduced in order to avoid rapid wear occasioned in prior devices by the rubbing action of the impact surfaces during the concurrent delivery of a blow and movement of the striking surface toward declutched position.

The reclutching mechanism, which is also novel, comprises an internal cam surface 65 on the dog 60 having the general shape of a sector of a cylinder whose center lies on the near side of the axis of revolution of the clutch. This internal cam cooperates with the anvil jaw 37, the periphery of which is a cylindrical surface concentric with the axis of revolution and the sides of which constitute flat, impact receiving shoulders or stricken surfaces 67 extending in an approximately radial direction. Intermediate the jaws 37 the tool head has a pair of reclutching cams 66 which guide the dogs after the delivery of the impact and prior to the engagement of the internal cam 65 with the stricken jaw 37. While a variety of shapes is possible, it is desirable as a manufacturing expedient to provide the intermediate anvil cam with a concentric cylindrical surface extending between a pair of slanting flat faces which continue substantially to the base of the jaw 37.

Referring to Fig. 14 which shows the hammer dog just after it has been declutched, the trailing end of internal cam 65 rides over the flat slanting faces of intermediate cam 66 to initiate a clockwise turning movement of the dog about its own pivot 61 as it revolves clockwise with the carriers about the tool head axis. Before the dog is released from the intermediate cam 66 it makes contact with the edges of the jaw 37. Fig. 11 shows the jaw revolved about 90 degrees beyond the previous impacting position, or one-half the circumferential distance to the next succeeding impact. Due to the eccentricity of the internal cylindrical surface 65, continued clockwise movement of pivots 61 about the tool head axis causes continued clockwise turning motion of the dog about its own pivot. Fig. 12 shows the dog leaving the jaw 37 and near one extreme of its oscillatory movement about pivot 61 wherein the impact shoulder 68 of the dog coincides with the impact receiving area 67 on the anvil. Within an extremely short period of time following disengagement of the camming surfaces, the dog 60 delivers a rotational hammer blow to the anvil, the impact surfaces then being completely aligned, the position of the parts being as illustrated in Fig. 13. Between the time the dog leaves one anvil jaw and strikes the next, the hammer dog does not move partially out of impacting alignment because of its inertia. As an additional safe-guard against accidental displacement of the hammer dog, it may be so mounted that the center of gravity of the weight 60 is slightly offset from the center of pivot 61 toward the anvil 37, for example, at the point 69 (Figs. 10 and 11). Thus mounted, the weight is dynamically unstable and when thrown out of balance with a radial line extending between the centers of the tool head and pivot 61, tends to remain off balance.

Placing the pivot axis 61 outside the orbital path of the center of gravity of the hammer dog 60 has a further advantage in that it resists the tendency to impact repeatedly during the running up period that is, while the tool head encounters little resistance by the driven bolt or nut N (Fig. 1). Prior to the seating of the driven nut the parts of the clutch revolve in unison, the hammer dogs tending to remain in the position illustrated in Fig. 13 due to inertia, clutch friction and the unbalancing action of centrifugal force, but release and re-engage occasionally due to the friction on the driven nut.

Declutching and reclutching is accomplished primarily by the action of sets of cams. It should be understood, therefore, that the use of centrifugal force for urging the hammer dogs toward reclutching position is of secondary importance and while it is believed to improve the action is not regarded as indispensible to the successful operation of the present impact wrench. The dogs could be pivoted if desired to swing about a pivot so positioned that the centrifugal force would not tend to hold the hammer weight in a position such as shown in Fig. 13 and very satisfactory results could be obtained even with such an arrangement.

The impact receiving surfaces or shoulders 67 may be disposed in a plane parallel to and slightly beyond a diametrical plane as illustrated in Fig. 13. This arrangement has been selected as a result of experiments to produce the best results having regard for the changes in shape of the striking and stricken surfaces as the parts become worn. The impact delivering surface 68 which forms part of the leading face of the hammer dog should be so positioned, of course, that it becomes aligned with the surface 67 at the instant of impact.

The force of the blow, whose rotational or tangential component is many times greater than the torque delivered by the motor 23, is due principally to the conversion of the angular momentum or kinetic energy stored in the massive hammer assembly during the preceding half revolution of lost motion while the hammer was out of driving engagement with the anvil. The reaction of the force delivered by hammer dog 60 is normal to the plane of the impact surfaces 67 and 68 which direction is indicated by the arrow R in Fig. 13. In the preferred embodiment, this arrow passes approximately through the center of pivot 61.

In order that the impacts may be delivered in succession, declutching mechanism must be provided for rocking the dogs counterclockwise from the Fig. 13 to the Fig. 14 position. Theoretically declutching of the structure thus far described could be accomplished by merely tapering the sides of the jaw 37 outwardly whereby the reaction of the blow, indicated by the arrow RA in Fig. 17 would pass to the left of the axis 61, thereby declutching by the use of the reaction of the hammer blow itself. Such a self-releasing arrangement, having a direct drive from the rotor shaft 30 to the carrier 50 and pivot pin 61, has been tried experimentally and found to have certain shortcomings. One objection arises from the fact that during the delivery of the hammer blow the radial (declutching) component of force on the impact end of the hammer dog is proportional to the tangential (driving) component and the dog is rubbed over the anvil by a declutching force which is greatest at the time that the impact and hence the friction are at their peak values. This repeated rubbing action under tremendous pressure would cause the anvil jaws and hammer dogs to wear out too rapidly.

Another objection to the use of the reaction of the impact surfaces as a sole declutching means is that the angles that would be selected as most desirable under the usual impacting conditions might, under other conditions of operation, be ineffective to release the clutch in opposition to the friction.

The problems aforementioned are solved by a novel declutching mechanism so arranged that it imparts a positive force to the hammer dog but does not begin to slide it off the anvil jaw until the blow has been delivered and the contact pressure between the impact surfaces 67 and 68 has been reduced to a predetermined moderate amount. According to the invention the declutching mechanism is embodied in the driving means by directing the driving force against the pivoted dogs in such a way that it sets up components of force in a declutching as well as in a driving direction.

The driving cam 51 has a pair of radial arms 70 projecting into driving engagement with recesses 71 at the rear end of the hammer dogs 60. In order to permit rocking motion of the rectangular shaped recesses relative to the arm, the peripheral surface of the latter is curved and the side walls are tapered away from the dog. Referring to Figs. 15 to 18 inclusive, it is seen that the carrier associated with the pivot pins 61 has a few degrees of turning movement relative to the driving cam 51, the carrier trailing behind the driving cam during the first half of the lost motion period of the hammer and advancing ahead of the driving cam during the last half which immediately precedes the impact. During the time the clutch is meshed, as shown in Fig. 10, there is very little rotary movement of the carrier, but the driving cam 51 and rotor shaft 30 turn through a few degrees and again lead the carrier at the start of the lost motion interval.

Referring to Figs. 10 and 15 to 18, it is apparent that clockwise driving movement of the driving cam 51 ahead of the carrier parts 61 etc. rocks the hammer dogs about their pivots in a counterclockwise or declutching direction. On the other hand, clockwise rocking toward reclutching position, which is caused by a separate set of cams 65, 66, 37, is effected to force the carrier ahead of the driving cam.

Some of the forces acting on the dog 60 at the time it is being declutched are represented diagrammatically in their approximate directions, but not in proportion, by the arrows D, F and R in Figs. 10 and 13. The declutching force D, corresponding to the pressure by the declutching cam 51, is so directed that it tends to turn the dog 60 counterclockwise about the axis of pivot 61. The reaction of the impact or contact pressure between the shoulders 67 and 68 is normal to the plane in which the impact surfaces coincide. The reaction force R at the center of the impact shoulders is arranged to lie approximately in line with the axis of pivot 61 in order to minimize any positive self-locking or self-releasing turning moment on the dog that may result directly from the impact. For the declutching force D to become effective, however, it must overcome the moment of the force of friction F acting between the impact surfaces 67 and 68. The friction F is directly proportional to the impact or contact pressure R between the impact surfaces and acts on a larger radius than that of the declutching force D. The declutching pressure of the latter, while variable during the impacting phase, does not fluctuate as violently as the force of the impact R or attain nearly the same magnitude. During the delivery of the impact, the force D remains ineffective until the force R and proportional force F have dropped below a predetermined amount so that their resultant moments are overpowered by those of force D. This overpowering does not take place until the delivery of the hammer blow is practically completed and the hammer assembly and rotor 31 are substantially arrested relative to the tool head 35, after which the hammer dog 60 slides easily off the anvil.

As apparent from Fig. 10, declutching movement of the dog is accompanied by a slight misalignment of the planes of impact surfaces 67 and 68, whereby the pivot 61 moves, first rearward, then forward, through a slight arc as the inner corner of shoulder 68 slides over impact surface 67. The slight retrograde movement of the pivot pin and carrier, relative to the anvil, in opposition to the driving pressure D, has the effect of supplementing the holding force of friction F not only upon termination of an impact but also while the parts are rotating in unison in the Fig. 13 position.

The clutch does not become stuck and stall the motor more than momentarily because by the time the hammer assembly has transferred all of its momentum to the motor, the forces F and R drop to values which bear a definite ratio to the declutching pressure D and the combined moments of which are less than the declutching moment of force D.

If desired, the impact surfaces 67 and 68 may be arranged in planes so positioned that the reaction of the impact (arrow RB in Fig. 17) passes to the right of pivotal axis 61 in which case the moment of declutching force D would be required to overcome the sum of the moments of the reaction RB and friction forces. Alternatively, the reaction force may be directed slightly to the left of pivot 61 to permit the declutching cam 51 to become effective when its moment overcomes the difference between the moments of the friction and reaction forces. Variations of the impact angle of more than a few degrees, however, are not considered desirable. A change in the locking direction RB may result in the clutch sticking under moderate load or on "soft work." A change in the self-releasing direction (RA Fig. 17) will increase the rate of wear. The effect of wear over a period of time is gradually to shift the impact angle toward the self-releasing direction.

Preferably the shank 36 of tool head 35 is of sufficient axial length that advantage may be taken of the torsional elasticity of the steel. Thus, when a rotational hammer blow is delivered to the rear end of the tool head and the front end is held in engagement with a frozen nut N, the tool head twists slightly. Upon termination of the impact, the shank unwinds causing the hammer dogs 60, carrier members 50, 55 and 61, driving cam 70 and rotor 31 to rebound as a unit in a direction opposite to the rotary impact. The rebound acts to momentarily relieve contact pressure R between the impact surfaces 67 and 68 thereby facilitating declutching and reducing the rubbing action of the impact shoulders 67 and 68 on each other.

The front end of the shank 36 terminates at a socket engaging projection 74 of polygonal cross section fitting a correspondingly shaped opening 75 in wrench socket 76 for the driven bolt or nut N. The end of the tool head and the socket have registering transverse apertures 78 and 79 which receive a locking pin 80. The pin is preferably a rigid cylindrical rod and serves to prevent accidental detachment of the socket from the tool head projection 74, but permits ready removal and replacement of the socket when that is desired. As it is not feasible to make a substantially perfect fit between the socket 76 and the tool head projection 74, there is a slight amount of lost motion between these parts when a torsional impact is transmitted. In order that the entire blow may be delivered to the wrench socket direct and not through the locking pin, which might cause the latter to shear or become deformed, the pin is so mounted that it normally engages only one of the two elements that it locks, for example, the tool head projection 74. This is accomplished by making the apertures 79 in the socket larger than the aperture 78 which fits the pin 80. A simple expedient is employed for preventing accidental movement of the locking pin 80 lengthwise of its associated bore 78. Accordingly, the locking pin is secured by means of a retainer ring 81 of elastic material surrounding the pin and frictionally engaging a cylindrical surface on the socket member 76. It has been found that a rubber band of ordinary construction whose diameter when untensioned is less than that of the cylindrical portion of the socket is admirably suited for this purpose and that such a retainer does not become displaced under vibration as it has little weight and a large amount of friction, but is adapted to be shifted manually and readily upon further stretching.

Briefly summarizing the operation of the illustrative embodiment of the invention let it be assumed that the operator has manipulated the throttle lever (not shown) and reverse lever 33 to admit air to the motor 23 to drive the socket 76 in a clockwise direction, looking forward. The driving cam 70, having a direct connection with the rotor shaft 31, delivers a force to the hammer dog 60 in such a direction that the dogs have imparted to them a motion of revolution about the axis of tool head 35 and a component of force which tends to declutch them relative to the anvil jaws 37 on the tool head. The dogs are pivotally mounted on a carrier assembly which includes the carrier plates 50 and 55 and the pivot pins 61 and this assembly is carried with the dogs as they revolve. Assuming that the tool head does not immediately partake of the rotation of the hammer assembly, the position of the latter relative to the tool head is guided by the cam connection 37, 65, 66 through the positions indicated in Figs. 14, 11, 12 and 13 until the clutch becomes fully meshed, with the impact shoulders 67 and 68 contacting each other over their entire areas. If the resistance to rotation of the driven nut N is relatively slight, the clutch parts may remain for a considerable period in the Fig. 13 position, all parts revolving in unison due partly to the friction between the surfaces 67 and 68 and between the dogs 60 and their pivots 61. As before stated, the plane in which the impact surfaces 67 and 68 coincide is so located relative to pivot 61 that the initial rocking movement of the dog away from the Fig. 13 position must be accompanied by a slight retrograde movement of pivot pins 61 with their associated carriers relative to the anvil. Opposition by the driving force to such retrograde movement supplements the effect of the force of friction in holding the parts in the Fig. 13 position. Centrifugal force may also be availed of to aid in holding the clutch dog in the Fig. 13 position by so arranging the center of gravity of the dog that the latter tends to remain in one extreme position or the other of its oscillatory movement. As the nut N is being driven, the dog may occasionally be declutched to the Fig. 14 position and move into re-engagement with an impact. While it is desirable to minimize impacting during the running up period of the driven nut, such action is not regarded as highly objectionable.

After the nut N becomes seated, the resistance to further rotation of the nut and consequently of the socket 76, tool head 35 and anvil jaws 37, increases abruptly. The pressure of the driving cam 51 against the hammer dog 60, which is represented by the arrow D in Fig. 10 increases with the torque requirement and, when the moment of its force about the pivotal axis 61 overcomes the opposing moments the clutch disengages to the Fig. 14 position, the dog 60 being moved to its extreme counterclockwise position relative to pivot 61. The internal cam surface 65 on the dog engages first the tool head cam 66, then the jaw 37, to cam the dog clockwise about axis 61 as it revolves through the positions indicated by Figs. 11, 12 and 13. Just before the dog reaches the Fig. 13 position the hammer impact surface 68 is moved to proper alignment with the impact receiving surface 67 on the anvil jaw. The aligning or re-clutching is effected by a positive cam action and is accomplished at any selected speed of rotation since it is not dependent upon centrifugal or spring means proportioned to a particular motor speed. The operator may reduce the speed, by reducing the pressure of the air supplied to the rotary motor 23, and continue the delivery of impacts over the entire surfaces of shoulders 67 and 68.

The impact of the hammers 60 against the anvil jaws 37 arrests rotation (relative to tool head 35) of the dogs, carrier unit 50, 55, 61, driving cam 51 and rotor 31. At first, release of the dog from the Fig. 13 to the Fig. 14 position is prevented due primarily to the frictional contact between the impact surfaces 67 and 68 under tremendous pressure. Upon absorption of the momentum of the driving unit including the rotor, carriers and hammer dogs, the reaction of the pressure on the impact surfaces diminishes and so does the friction until the phase is reached at which their resultant moments are overcome by the moment of the declutching force set up by the driving cam 70 on the hammer dog 60. As soon as the dogs are declutched, the driving unit is relieved of its load and accelerates to accumulate kinetic energy during a half turn of the motor after which the driving unit is arrested with another impact. The succession of impacts is continued as long as the operator holds the wrench socket in engagement with the torque resisting nut and continues the supply of air to the motor. If the resistance to rotation is moderate the dogs will be declutched before the driving unit comes to a complete rest relative to the wrench casing 19 although the driving unit is arrested at the time of each impact relative to the tool head 35.

The rotating parts of the illustrative embodiment are all symmetrically arranged and it will be understood without further description that the device will operate in the same manner for either direction of rotation. In operation the wrench will ordinarily be used more in one direction than in the other causing the impact shoulder 68 on one side of the hammer 61 to wear ahead of the impact shoulder on the other side. As shown in Fig. 7, the recess 71 which receives the driving cam 70 is provided at both ends of the hammer 60 whereby the hammer may be inverted at the time of servicing to equalize wear between impact surfaces 68.

While the invention has been disclosed in what is believed to be a preferred form it should be understood that some of the features can be used apart from other features and that many modifications and adaptations may be resorted to without departing from the spirit of the invention and the scope of the appended claims.

The shock absorbing bearing for the tool head 35, which includes the steel bushing 39 and resilient sleeve 40, forms the subject matter of divisional application, Serial No. 440,173, filed April 23, 1942. Another divisional application, Serial No. 440,174, filed on the same day, is directed to the arrangement of the elastic retainer ring 81 and the locking pin 80 for the wrench socket 76.

What is claimed is:

1. An automatic overload release clutch comprising a driven spindle having jaws, a revoluble carrier, dogs supported by the carrier for pivotal movement about axes parallel to the driven spindle, releasable means for holding the dogs in driving engagement, and means for delivering a driving force to each of the dogs at a point offset from the pivotal axis to impart to the dogs a releasing component of force adapted to overcome the holding means when the torque requirement of the driven spindle becomes excessive, characterized in that the means for delivering a driving force to the dogs comprises a driving cam coaxial with the spindle and having projections loosely fitting complementary recesses in the dogs, the recesses being intermediate the spindle and the pivotal axis.

2. An impact clutch comprising a rotatable anvil, a revoluble impact hammer pivoted about an axis parallel to the anvil for movements in clutching and declutching directions, cam means between the hammer and anvil for positively moving the hammer in the clutching direction, and separate cam means for moving the hammer in the releasing direction.

3. An impact clutch comprising a rotatable hammer assembly, a rotatable anvil, impact shoulders carried by the hammer assembly around the anvil, means for simultaneously driving the hammer assembly and moving the shoulders relative thereto into the path of the anvil whereby the hammer assembly delivers a rotary impact to the anvil through the shoulders, and means responsive to the arrest of motion of the hammer assembly relative to the anvil for automatically moving the shoulders out of the path of the anvil, characterized in that the impact shoulders are carried by dogs of arcuate shape and so pivoted that one end of the dog is compelled to move into the circular path of the anvil before the other end can move out of said path.

4. An impact clutch comprising a drive shaft, a driven spindle coaxially rotatable with said shaft and having an anvil portion near the end of the spindle that faces the shaft, a revoluble hammer carrier comprising a substantially rigid structure one end of which is supported around the drive shaft and the other end of which is supported around the spindle, hammers having substantial mass mounted for revolution in a path surrounding the anvil, automatic means for moving the hammers relative to the carrier into engagement with the anvil to deliver a hammer blow, and means for automatically moving the hammers in the opposite direction upon termination of the hammer blow.

5. An impact clutch according to claim 4 in which the means for moving the hammers relative to the carrier for impacting the anvil comprise complementary cam elements between the hammers and anvil.

6. An impact clutch according to claim 4 in which the hammer and anvil have complementary engageable impact shoulders extending lengthwise of the spindle.

7. An impact clutch according to claim 4 in which the hammer dogs are pivoted for rocking movement relative to the carrier about axes extending parallel to the axis of rotation of the spindle.

8. An impact clutch comprising an anvil having spaced jaws, a hammer assembly surrounding the anvil and comprising dogs adapted to rock about pivots extending parallel to the axis of the anvil, each dog having an impact surface at its leading end positioned to engage the anvil jaws when rocked in one direction, automatic means for rocking the dogs in the opposite direction to interrupt the driving connection between the hammer assembly and anvil, and complementary cam surfaces on the anvil and dog for automatically rocking the dog in the direction first mentioned as the hammer assembly rotates ahead of the anvil.

9. An impact clutch according to claim 8 in which the cam surface of the dog forms an arc whose center is between the dog and the center of the anvil, said arc shaped cam surface slidably engaging the anvil jaw upon separation of the impact surface therefrom.

10. A reversible impact clutch comprising a rotatable anvil having spaced jaws, the opposite sides of which provide impact shoulders, a hammer assembly comprising a carrier and a plurality of hammer dogs each pivoted to the carrier about an axis parallel to the axis of rotation of the anvil, each dog being provided with impact shoulders at its opposite ends and having the pivotal axis near its center, means for selectively driving the hammer assembly in either direction, means for automatically rocking the impact shoulder at the leading end of the dog into the path of a complementary impact shoulder on an anvil jaw as the hammer assembly rotates independently of the anvil, whereby to cause the delivery of a rotational hammer blow to the anvil, and means for automatically rocking the hammer dogs in the opposite direction upon termination of the hammer blow.

11. An impact clutch comprising a rotatable anvil having spaced jaws, a rotatable hammer assembly having impact shoulders movable into and out of the path of the jaws, means automatically operable when the hammer assembly encounters resistance to withdraw the impact shoulders from the path of the jaws to permit the hammer assembly to rotate ahead of the anvil, cam means responsive to movement of the hammer assembly ahead of the anvil to positively move the impact shoulders into a position aligned with the path of the jaws, and centrifugal means for holding the shoulders in the position last mentioned until they engage the jaws with an impact, said centrifugal means comprising a dynamically unbalanced weight integral with each impact shoulder.

12. A clutch comprising a driven spindle having one or more jaws, a revoluble carrier, a driving dog supported by the carrier for limited rocking movement relative thereto about an axis parallel to the spindle axis and having a driving surface adapted to mesh with the spindle jaw when the dog is rocked to one extreme position, characterized in that the center of gravity of the dog lies between its pivotal axis and the spindle axis at the time when the dog is in an intermediate position, whereby centrifugal force tends to hold the dog in mesh with the spindle at times when the dog is dynamically unbalanced away from the intermediate position.

13. An impact clutch comprising a rotatable anvil having longitudinally extending jaws, hammer dogs revoluble in a path surrounding the jaws, a revoluble carrier for the dogs, said dogs being pivotally mounted on the carrier for limited rocking movement into and out of the path of the anvil jaws, the pivotal axes extending parallel to the axis of rotation of the anvil, means for driving the dogs, said driving means comprising a driving cam coaxial with and adjacent one end of the anvil, said cam having a projection associated with each dog, the dog having a slot to receive the projection, said projection engaging the side wall of said slot to impart a force to the dog extending along a line slightly offset inwardly from the pivotal axis of the dog, whereby to tend to rock it toward releasing position.

14. An impact clutch comprising a rotatable drive shaft, a rotatable anvil coaxial with the drive shaft and arranged with its rear face adjacent the front face of the drive shaft, a driving cam surrounding the drive shaft and keyed thereto, a revoluble carrier assembly supported for rotation on the driving cam and on the anvil and having longitudinal pivot pins rotatable in a path surrounding the anvil, hammer dogs pivoted on said pins and arranged to rock into and out of clutch engaging relation with the anvil, and a driving connection between the cam and the dogs, said driving connection comprising an extension on the dog extending rearwardly of the anvil, and complementary engageable driving shoulders on the cam and extension, said shoulders being directed to impart a force along a line slightly inward of the pivotal axis of the dog, whereby said force is resolved into a driving and a declutching component.

15. An impact clutch comprising a rotatable anvil having longitudinally extending impact receiving shoulders, a hammer carrier comprising a plurality of pivot pins revoluble in an annular path surrounding the path of the anvil shoulders, hammer dogs mounted for rocking movement on the respective pins, means for rocking the dogs to move their impact shoulders out of the annular path of the anvil shoulders to release the clutch, and reclutching means for positively moving the dogs into the annular path of the anvil shoulders following release therefrom, said reclutching means being responsive to revolution of the pivot pins relative to the anvil.

16. An impact clutch comprising a rotatable hammer carrier, a rotatable anvil, means for driving said hammer carrier, hammer dogs pivoted to the carrier, successively disengageable and re-engageable impact shoulders on said hammer dogs and anvil respectively, automatic means for causing disengagement of the impact shoulders, and means for automatically effecting re-engagement of said shoulders, said re-engaging means comprising cams carried by the hammer dogs and anvil respectively for positively imparting pivotal movement to the dogs with respect to the carrier.

17. An impact clutch comprising a rotatable anvil, a coaxially rotatable hammer carrier, impact dogs carried by the hammer carrier, successively disengageable and releasable impact shoulders on the dogs and anvil respectively, declutching means for moving the dogs relative to the carrier to release the dogs from the anvil, and reclutching means for automatically moving the dogs relative to the hammer in a re-engaging direction, said reclutching means comprising a cam carried by the anvil and having slidable engagement with a complementary cam element carried by each of the hammer dogs, the engageable surface on said anvil cam being eccentric to the axis of rotation of the anvil to impart positive reclutching motion to the dog as it moves thereover.

18. An impact clutch comprising a rotatable anvil having longitudinally extending jaws, dogs revoluble around the periphery of the anvil, a carrier revoluble with said dogs and supporting the dogs for independent pivotal movement about longitudinal axes, each dog having a driving shoulder at its leading end movable to engaging and releasing positions respectively into and out of the annular path of the anvil jaws, reclutching means for automatically rocking the dog to engaging position upon revolution of the dog ahead of the anvil, and means for driving the dogs with a component of force tending to move them toward releasing position.

19. An impact clutch as defined in claim 18 in which the driving means comprises a cam engaging the dog along a line intermediate the pivotal axis of the dog and the axis of revolution of the anvil.

20. An impact clutch comprising a rotatable anvil having jaws, a rotatable hammer assembly having a carrier of substantial inertia and having a plurality of impact dogs carried thereby and arranged for° movement relative thereto into and out of the path of rotation of the anvil jaws, automatic means for moving the dogs out of the path of the anvil jaws to release the hammer assembly for rotationi ahead of the anvil, and positive means for automatically effecting re-engagement of the hammer dogs and anvil jaws, said re-engaging means comprising a cam surface on each dog engageable with a portion of the anvil.

21. A reversible impact clutch comprising a rotatable anvil having jaws, a plurality of hammer dogs revoluble in a path which surrounds the anvil jaws, each dog being mounted for limited rocking motion about a pivotal axis extending parallel to the axis of revolution of the anvil, each dog having impact shoulders adapted to be rocked into and out of the path of rotation of the anvil jaws to deliver a succession of impacts to the anvil, characterized in that the dog is of symmetrical shape with the pivotal axis near its center and the impact shoulders at its opposite ends, whereby the dog is adapted for operation in either direction of rotation.

22. In a reversible impact clutch, a hammer dog of generally arcuate shape having a longitudinal opening extending through the dog near its center to receive a pivot pin, an impact shoulder on each end of the dog, and a recess adjacent said opening and arranged to receive a driving member.

LESTER A. AMTSBERG.